Patented May 25, 1937

2,081,273

UNITED STATES PATENT OFFICE 2,081,273

CHEESE MANUFACTURE

Friedrich Hoermann von und zu Guttenberg, Dusseldorf, and Helmut Firgau, Dusseldorf-Oberkassel, Germany, assignors to Henkel & Cie G. m. b. H., Dusseldorf-Holthausen, Germany, a corporation of Germany No Drawing. Application April 18, 1935, Serial No. 17,134. In Germany April 28, 1934

11 Claims. (Cl. 99—162)

This invention relates to cheese products and methods of manufacturing the same. More particularly, it concerns the production of cheese products distinguished by their unusual flavor and uniformity in texture, which properties are obtained by incorporating into standard cheeses or cheese bases a small quantity of one or more of a group of the specific phosphate compounds hereinafter described.

An object of the present invention is to produce a class of cheese products which possesses a distinctive taste and consistency.

Another object of the invention is to provide for the trade a so-called melted cheese (Schmelzkaese) or fluid cheese of a new and different flavor, which if so desired may possess a consistency rendering it adaptable to slicing.

Another object is to produce softer or more fluid cheeses from cheese products of a harder consistency.

Still another object of the invention is to provide cheese products which will readily melt when used for cooking or other purposes. A further object is to produce cheeses of special properties through the use of certain fluxes in addition to the phosphate compounds herein disclosed.

Broadly considered, the above objects are attained by homogeneously incorporating in cheeses or cheese bases small quantities of alkaline polyphosphates, which substances possess the qualities necessary to impart the unusual taste and consistency to the final product. The water soluble alkaline polyphosphates suitable for use include particularly those sodium polyphosphates containing water of crystallization which are described in the publication by Gmelin, entitled "Handbuch der Anorganischen Chemie", volume on Sodium, published 1927, on pages 924 and 925. Of the sodium polyphosphates found operable mention may be made of those possessing the formulas $Na_5P_3O_{10}$, $Na_6P_4O_{13}$, $Na_9P_5O_{17}$, $Na_{11}P_9O_{28}$, $Na_{12}P_{10}O_{31}$ and $Na_{13}P_{11}O_{34}$. In certain instances the sodium polyphosphate possessing the formula $Na_6K_2P_6O_{19}$, can be used. Thus it may be seen that besides the sodium derivatives other alkaline polyphosphates may be employed. These polyphosphates may be prepared by the fusion of sodium or potassium oxide with phosphoric acid in stoichimetric proportions corresponding to the particular compounds, as will be obvious to skilled chemists from an early disclosure by Smith in the Journal of the Society of Chemical Industries, vol. 36, No. 8, page 419 (1917); or they obviously may be prepared in the manner disclosed in Gmelin's Publication, supra, and in Abbegg-Auerbach, 3 Bond, Leipzig, page 459 (1907), i. e. by fusing mixtures of pyrophosphates and metaphosphates.

The above mentioned polyphosphates may be used with cheese bases of a most diverse nature including those which heretofore have been actually used and also those which have been considered theoretically possible for the manufacture of cheese. Thus, both animal casein and vegetable casein may be compounded with the polyphosphates to produce products of commercial value. The polyphosphates, furthermore, may be employed together with coagulated milk cheese, whey cheese and with finished cheese products. Melted or fluid cheese products possessing excellent flavor and texture may be produced by the introduction of the polyphosphates herein described into such products as Swiss cheese, Tilsit cheese, Dutch cheese, Allgaeu cheese, Emmental cheese, Edam cheese and the like.

The action of the polyphosphates appears to be independent of the properties already possessed by the cheese or cheese base for its beneficial qualities are effective upon hard as well as soft cheeses, upon old as well as new cheeses and upon low fat content cheeses as well as high fat content cheeses.

In the production of cheese products which melt very readily, the polyphosphates herein disclosed are incorporated in the cheese in a quantity sufficient to the desired melting range without introducing sufficient alkali to become perceptible to the taste. For this particular purpose the polyphosphates must be used, either alone or together with other substances, under conditions of substantial neutrality, or, in other words, such that an aqueous solution will possess a pH value of 6.5 to 7.5. To obtain this required degree of hydrogen ion concentration, mixtures of the polyphosphates may be employed or single polyphosphates may be used together with other substances, which other substances, of course, must not unfavorably affect the taste or the quality of the cheese.

In order to obtain the novel taste and texture producible in accordance with the present invention, preferably about 1 to 5% polyphosphate in proportion to the weight of the cheese or cheese base is employed.

Cheeses of special properties may be prepared in accordance with another feature of the present invention by adding to the cheese in addition to the polyphosphate also a flux, for example, a salt of an organic acid like sodium citrate, sodium tartrate, and as well salts of other acids of phosphorous, such, for example, as the sodium salts of ortho, meta, or pyrophosphates.

In compounding the products of the present invention, we have found it suitable to add the polyphosphates to the raw material employed for the preparation of the cheese and alternatively also suitable to add the polyphosphate to a finished cheese which has been finely ground. For the preparation of melted or fluid cheese, we prefer that the polyphosphate be added to the very finely ground harder cheese and that the mixture be heated to a temperature not substantially in excess of about 100° C. Temperatures below 100° C. may be used with considerable effectiveness if the cheese material is worked under decreased pressure.

*Example 1*

A solution is prepared by stirring 2.5 kgs. of sodium polyphosphate having the formula $$Na_{13}P_{11}O_{34}$$

in 20 liters of water, which solution is then thoroughly mixed with 77.5 kgs. of hard cheese which has theretofore been reduced to a fine powder. The resulting mixture is then heated at approximately 80° C. under decreased pressure until the desired reaction takes place. The resulting homogeneous molten mass is poured into molds for hardening.

*Example 2*

One hundred and eighty grams of sodium polyphosphate having the formula $Na_6P_4O_{13}$ are dissolved in one liter of water. Seven hundred cubic centimeters of this solution are very thoroughly incorporated into 5000 grams of cheese which may either be of a soft nature or a finely powdered hard cheese like Edam cheese. The mixture is then heated to approximately 85° C. until the proper consistency and flavor is reached. By proceeding in this manner a spreading cheese or a melted cheese capable of being sliced is obtained, depending upon the kind of cheese initially employed.

By the herein described process, excellent varieties of melted or fluid cheese capable of being sliced and dispensed without waste may be prepared in a very short period of time. Cheeses of good quality and flavor may also be obtained in many instances by mixing a proportion of polyphosphate-containing cheese as herein described with other untreated cheese until a homogeneous mass is obtained.

It should be understood that the present invention is not limited to the specific compounds and other details hereinbefore given, but that it includes all equivalent substances and modifications coming within the general tenor of the specification and the scope of the appended claims.

We claim:

1. The process of improving the consistency and flavor of cheeses which consists of homogeneously incorporating in cheese a small quantity of an alkaline polyphosphate.

2. In the preparation of cheese products, the improvement which consists of adding to a cheese base an alkaline polyphosphate in a quantity of about 1 to 5% by weight of the cheese base.

3. A cheese product composed of a cheese base having its consistency and taste altered by the addition thereto of a small quantity of an alkaline polyphosphate.

4. A food product comprising cheese together with a small proportion of a sodium polyphosphate.

5. A cheese product comprising in combination, cheese and a small quantity of the polyphosphate $Na_{13}P_{11}O_{34}$.

6. A cheese product comprising in combination, cheese and a small quantity of the polyphosphate, $Na_6P_4O_{13}$.

7. The process of producing softer or more fluid cheeses from harder cheeses including hard and soft cheeses which consists in homogeneously incorporating an aqueous solution of a small quantity of an alkaline polyphosphate into a harder cheese and heating the mass to a temperature of from about 80 to 100° C. under subatmospheric pressure.

8. A fluid cheese comprising the combination of a soft cheese together with a small quantity of an alkaline polyphosphate.

9. A readily melting cheese product free of alkali taste which comprises cheese having uniformly distributed therethrough a small quantity of a sodium polyphosphate an aqueous solution of which hydrolizes substantially neutral.

10. A cheese product comprising in combination, cheese, from 1 to 5% by weight of a sodium polyphosphate and a small quantity of a fluxing agent.

11. The process of producing an easily melting cheese which includes the steps of mixing a small quantity of alkali polyphosphate with a cheese base and heating the mixture to a temperature not substantially in excess of 100° C.

FRIEDRICH HOERMANN
   VON UND ZU GUTTENBERG.
HELMUT FIRGAU.